(12) United States Patent
    Spencer

(10) Patent No.: US 8,895,132 B2
(45) Date of Patent: Nov. 25, 2014

(54) HEMMED PANEL

(75) Inventor: Stacey Matheny Spencer, High Point, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 247 days.

(21) Appl. No.: 13/517,176

(22) PCT Filed: Dec. 13, 2010

(86) PCT No.: PCT/US2010/060056
§ 371 (c)(1),
(2), (4) Date: Jun. 19, 2012

(87) PCT Pub. No.: WO2011/084378
PCT Pub. Date: Jul. 14, 2011

(65) Prior Publication Data
US 2012/0270011 A1    Oct. 25, 2012

Related U.S. Application Data

(60) Provisional application No. 61/292,300, filed on Jan. 5, 2010.

(51) Int. Cl.
    *B32B 3/04*      (2006.01)
    *B62D 25/10*     (2006.01)
    *B62D 27/02*     (2006.01)
    *B60J 5/04*      (2006.01)

(52) U.S. Cl.
    CPC ............ *B62D 25/105* (2013.01); *B62D 27/026* (2013.01); *B60J 5/0469* (2013.01)
    USPC ............ 428/124; 428/595; 156/226; 156/295

(58) Field of Classification Search
    CPC ...................................................... B60J 5/0469
    USPC ........... 428/124, 126–129, 595; 156/226, 295
    See application file for complete search history.

(56) References Cited

U.S. PATENT DOCUMENTS

| | | |
|---|---|---|
| 3,909,919 A | 10/1975 | Miyabayashi et al. |
| 4,719,689 A | 1/1988 | Yamamoto et al. |
| 5,273,606 A | 12/1993 | Greve et al. |
| 5,362,120 A | 11/1994 | Cornille, Jr. |
| 5,730,446 A | 3/1998 | Taylor et al. |
| 6,368,008 B1 | 4/2002 | Biernat et al. |
| 6,696,147 B1 | 2/2004 | Herring, Jr. et al. |
| 7,115,322 B2 | 10/2006 | Curtiss et al. |
| 7,422,652 B2 | 9/2008 | Ondrus et al. |
| 7,520,560 B2 | 4/2009 | Frank et al. |

*Primary Examiner* — Alexander Thomas
(74) *Attorney, Agent, or Firm* — Michael Pruden; Martin Farrell

(57) ABSTRACT

The present invention relates to a hemmed panel and a method for fabricating a hemmed panel. The hemmed panel includes an inner panel, an outer panel, and an adhesive. The inner panel is provided with a first face, a second face, and an edge that defines a plurality of cutouts. The outer panel is provided with a first face, a second face, and a border flange. The border flange of the outer panel is hemmed over the edge and the first face of the inner panel to form a hemmed portion on the outer panel. The adhesive bonds the first face of the inner panel to the second face of the outer panel, bonds the hemmed portion of the outer panel to the first face of the inner panel, and is located in the plurality of cutouts.

6 Claims, 5 Drawing Sheets

HEMMED PANEL

This is the National Stage of International Application No. PCT/US2010/060056 filed Dec. 13, 2010, which claims the benefit of U.S. Provisional Application No. 61/292,300, filed Jan. 5, 2010.

FIELD OF THE INVENTION

The present invention relates to an improved hemmed panel.

BACKGROUND OF THE INVENTION

Panels, such as those of sheet metal, are used to manufacture a variety of structures. By way of example, portions of vehicle bodies, such as, for example, hoods and doors, are often fabricated from panels of sheet metal, which may be provided with a variety of shapes, such as, for example, via stamping.

Often times a pair of such panels are joined together via a hemming procedure. A typical hemming procedure utilizes an outer panel and an inner panel. Typically, the outer panel is provided with a border flange, which is folded over or hemmed over the inner panel during the hemming procedure. For example, in the case of a vehicle hood, an inner panel may be centered on an outer panel and border flanges on four peripheral sides of the outer panel may be hemmed over the inner panel.

In addition to the hemming procedure, a liquid adhesive is often times utilized to bond the inner and outer panels together. The adhesive is typically applied to the outer panel prior to the hemming procedure. After the adhesive is applied, the outer and inner panels are pressed together, which causes the adhesive to flow both away and toward the border flange. After the adhesive is applied and the panels are pressed together, the flange ends on the outer panel are hemmed over the edges of the inner panel. Depending on the type of adhesive utilized, a heating process may be employed so that the adhesive solidifies and cures to securely bond the inner and outer panels together.

It is desirable to reduce the amount of adhesive used to bond the inner and outer panels together. Yet, it is often times difficult to select a suitable adhesive with the proper amount of viscosity and expansion rate to ensure adequate bonding of the inner panel to the hemmed portion to the outer panel.

Depending on the application, it may also be desirable in some situations for the space between the inner panel and the hemmed portion on the outer panel to be substantially filled with adhesive. Not only does such an arrangement strengthen the bond between the inner and outer panels, since it increases the surface area bonding the inner and outer panels, but it also prevents contaminants, such as moisture from entering the hemmed portion. Entry of moisture and other contaminants into the hemmed portion may cause or contribute to corrosion of the hemmed portion as well as the edge of the inner panel, and thus weaken the joint between the inner and outer panels. Even in applications where it is desirable to seal and substantially fill the hemmed portion, selecting a suitable adhesive with the proper amount of viscosity and expansion rate has been difficult.

The present invention is directed at an improved hemmed panel.

SUMMARY OF THE INVENTION

According to one embodiment of the present invention a hemmed panel comprises an inner panel, an outer panel, and an adhesive. The inner panel is provided with a first face, a second face, and an edge that defines a plurality of cutouts. The outer panel is provided with a first face, a second face, and a border flange, which is hemmed over the edge and the first face of the inner panel to form a hemmed portion on the outer panel. This adhesive bonds the first face of the inner panel to the second face of the outer panel, bonds the hemmed portion of the outer panel to the first face of the inner panel, and is located in the plurality of cutouts.

According to another embodiment of the present invention, a method for fabricating a hemmed panel comprises the steps of providing an inner panel that includes a first face, a second face, and an edge that defines a plurality of cutouts. The method further includes the step of providing an outer panel that includes a first face, a second face, and a border flange. The method further includes placing an adhesive between the first face of the outer panel and the second face of the inner panel and in the plurality of cutouts, whereby the adhesive substantially fills the cutouts and overflows outward from the cutouts. The method further includes hemming the border flange of the outer panel over the edge and the first face of the inner panel to form a hemmed portion on the outer panel, whereby the adhesive between the hemmed portion and the first face of the inner panel is pressed and flows towards a free edge of the hemmed portion.

DETAILED DESCRIPTION OF THE INVENTION

Figure 1:
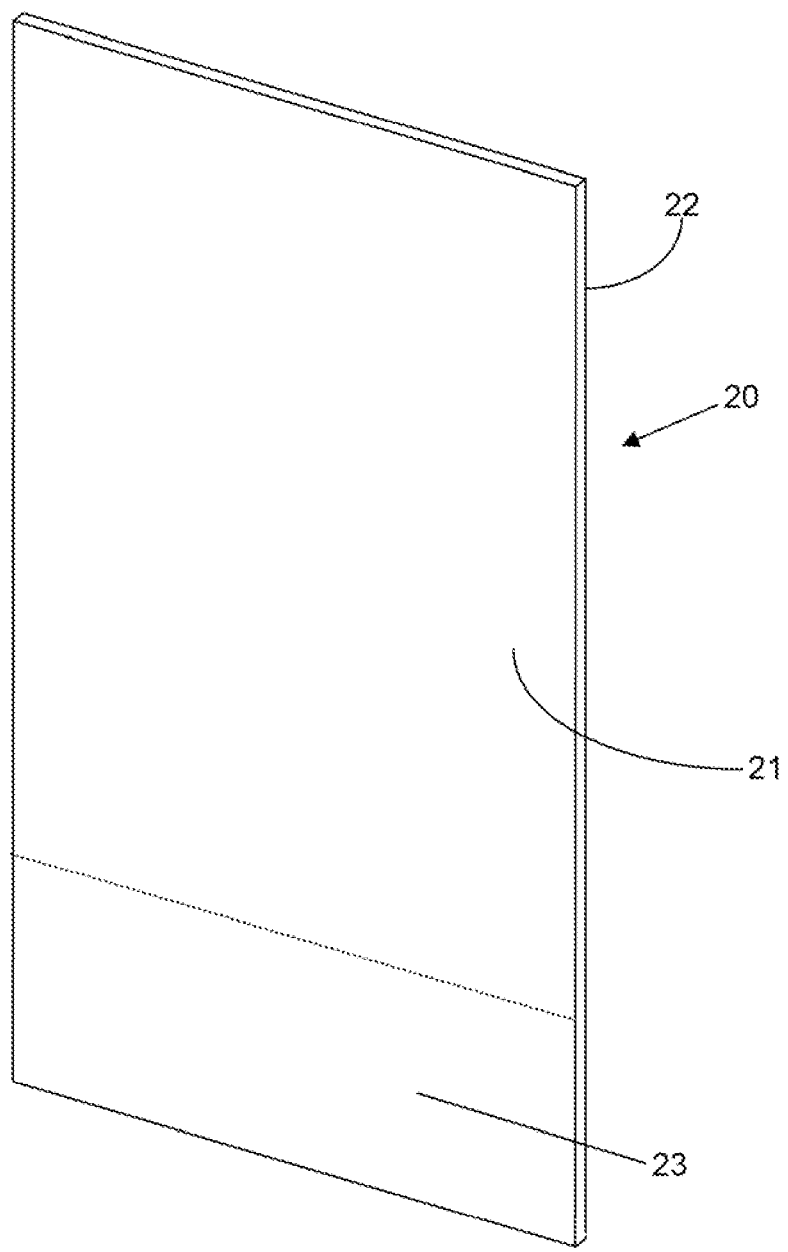
FIG. 1 depicts a perspective view of an outer panel according to one embodiment of the present invention.

FIG. 1 depicts an outer panel 20 according to one embodiment of the present invention. As shown in FIG. 1, the outer panel 20 is provided with a first face 21, a second face 22, and at least one border flange 23. According to one aspect of the present embodiment, the outer panel 20 is configured to be hemmed over the inner panel 30. According to another aspect of the present embodiment, the at least one border flange 23 on the outer panel 30 is configured to be hemmed over an edge 33 of the inner panel 30 to form a hemmed portion 24.

Figure 2:
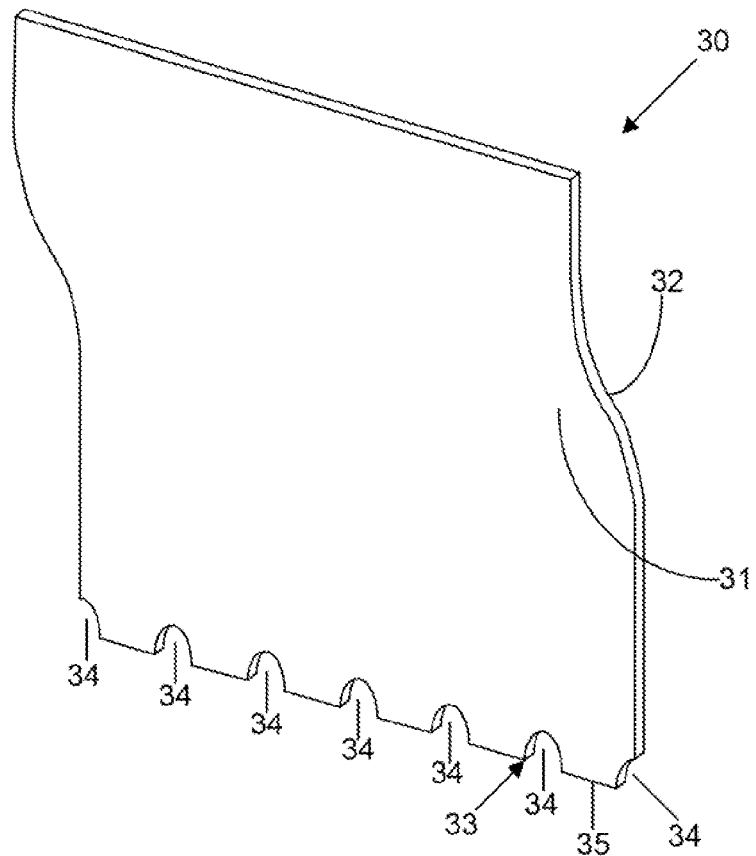
FIG. 2 depicts a perspective view of an inner panel according to one embodiment of the present invention.

FIG. 2 depicts an inner panel 30 according to one embodiment of the present invention. As shown in FIG. 2, the inner panel 30 is provided with a first face 31, a second face 32, and at least one edge 33. According to one aspect of the present embodiment, the edge 33 is configured to reduce the amount of adhesive 50 required to bond the inner panel 30 to the outer panel 20. According to another aspect of the present embodiment, the edge 33 is configured to increase the ability of an adhesive 50 to seal and substantially fill the hemmed portion 24.

As shown in FIG. 2, the edge 33 of the inner panel 30 preferably defines a plurality of cutouts 34. According to one aspect of the present embodiment, the cutouts 34 are configured to reduce the amount of adhesive 50 required to bond the inner panel 30 to the outer panel 20. According to another aspect of the present embodiment, the cutouts 34 are configured to increase the ability of an adhesive 50 to seal and substantially fill the hemmed portion 24.

As shown the cutouts extend upwards from the lower most portions 35 of the edge 33. Advantageously, the cutouts 34 receive adhesive 50 prior to the folding of the border flange 23 to form a hemmed portion 24. Advantageously, the adhesive substantially fills the cutouts 34, whereby the adhesive 50 is positioned above the lower most portions 35 of the edge 33 and whereby at least a portion 51 of the adhesive overflows outward from the cutouts 34. Accordingly, relative to an arrangement without cutouts 34, inclusion of the cutouts 34 reduces the distance the adhesive 50 must travel towards a free edge 25 of the hemmed portion 24 during the hemming procedure. Therefore, the amount of adhesive 50 used to bond the first face 31 of the inner panel 30 to the hemmed portion 24 of the outer panel 20 may be reduced. Further, by way of example, and not limitation, in applications where it is desirable, the amount of adhesive 50 used to seal and substantially fill the space between the first face 31 of the inner panel 30 and the hemmed portion 24 of the outer panel 20 may also be reduced.

Figure 3:
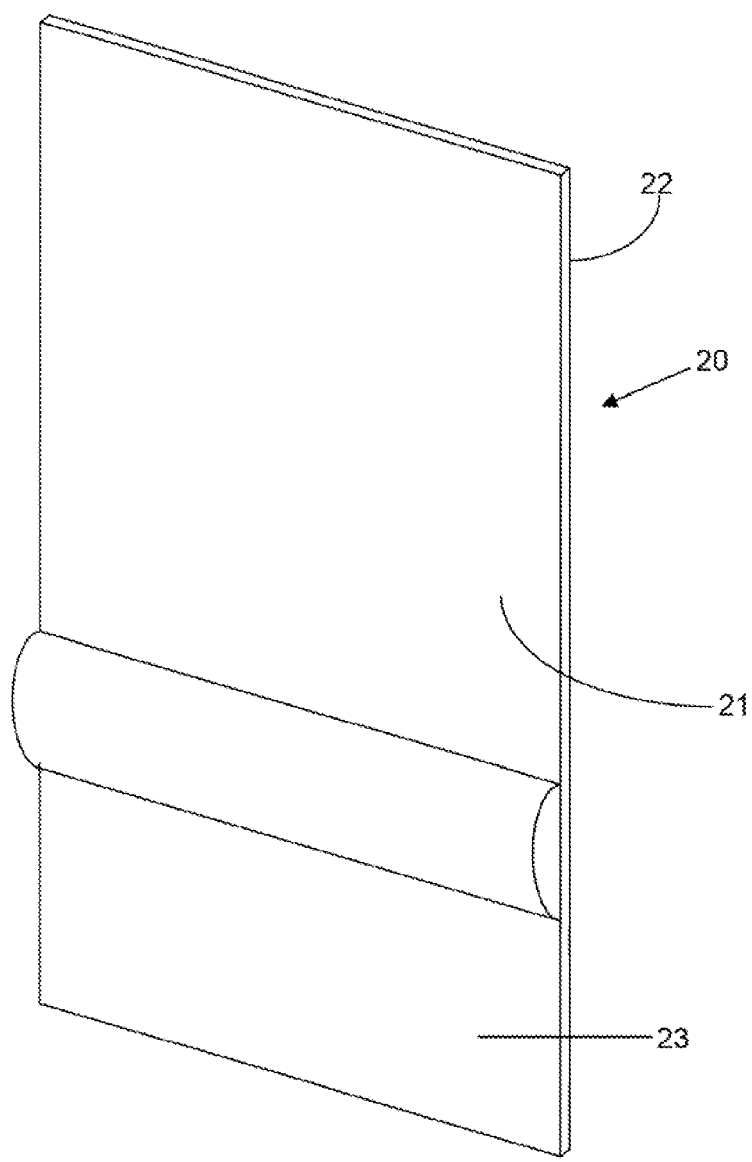
FIG. 3 depicts a perspective view of an outer panel and an adhesive according to one embodiment of the present invention.
Figure 4:
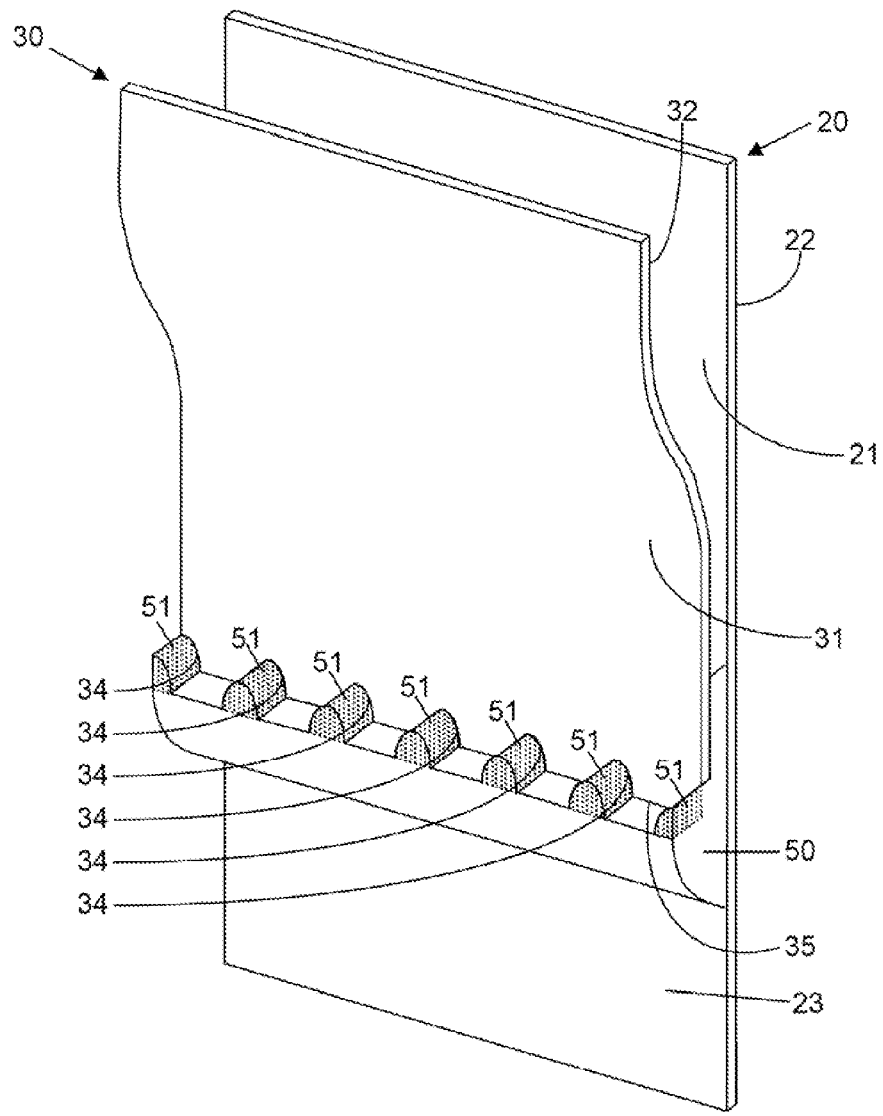
FIG. 4 depicts a perspective view of inner and outer panels and adhesive, wherein the inner and outer panels are pressed together prior to a hemming procedure in one embodiment of the present invention.
Figure 5:
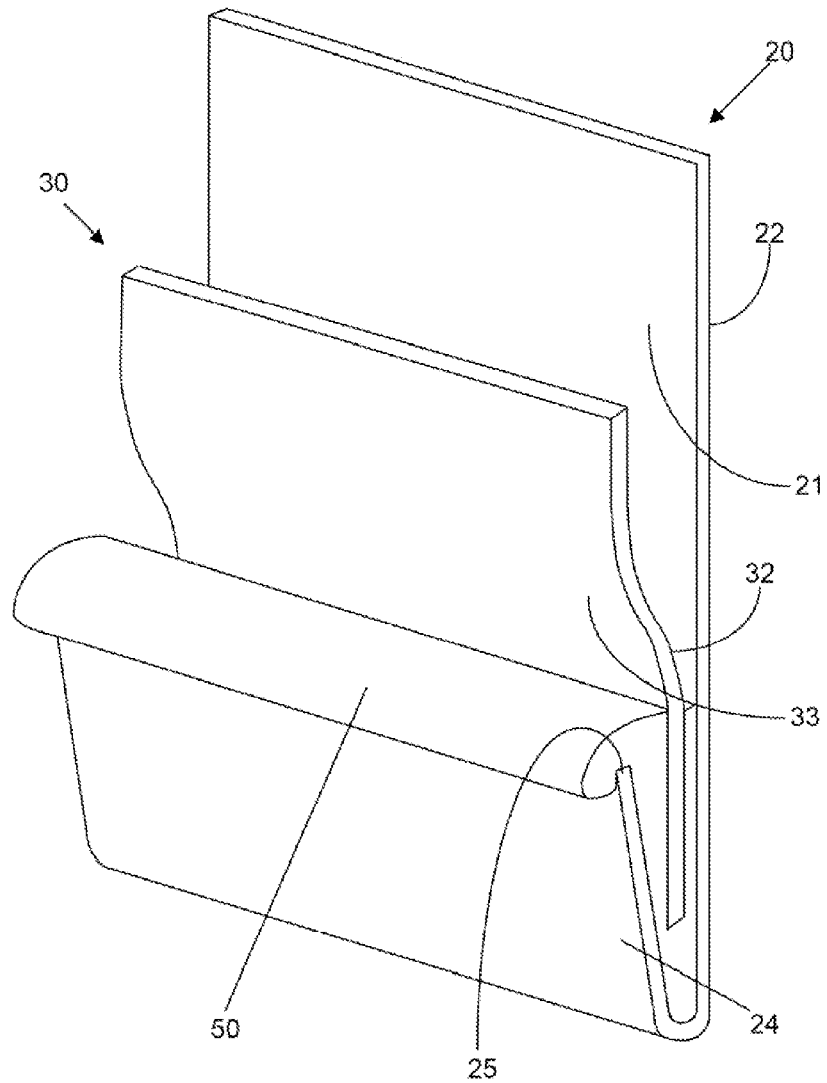
FIG. 5 depicts a perspective view of inner and outer panels and adhesive subsequent to a hemming procedure in one embodiment of the present invention.

Turning now to FIG. 3, during a hemming procedure, the adhesive 50 is applied to a face of the outer panel 20, for example on the first face 21 as shown. Turning now to FIG. 4, the first face 21 of the outer panel 20 and the second face 32 of the inner panel 30 are then pressed together, which causes the adhesive 50 to flow, typically, both away and towards the border flange 23. As shown in FIG. 4, as this occurs, the adhesive 50 substantially fills the cutouts 34 whereby at least a portion 51 of the adhesive overflows outward from the cutouts 34. As shown in FIG. 5, then the border flange 23 on the outer panel 20 is then hemmed or folded to form the hemmed portion 24, which preferably extends over the edge 33, the cutouts 34, and the first face 31 of the inner panel 30. As this occurs, the hemmed portion 24 presses the adhesive 50 between the hemmed portion 24 and the first face 31 of the inner panel 30, which causes the adhesive 50 to flow towards the free edge 25 of the hemmed portion 24.

As shown, in the preferred embodiment, the adhesive 50 flows in a manner which seals and substantially fills the space between the hemmed portion 24 and the first face 31 of the inner panel 30. Also shown, in the preferred embodiment, the adhesive 50 flows and extends over the edge 35 of the hemmed portion 24. In alternative embodiments, wherein sealing and substantially filling the space between the hemmed portion 24 and the first face 31 of the inner panel 30 is not important, the amount of adhesive 50 required to ensure sufficient bonding between the first face 31 of the inner panel 30 and the hemmed portion 24 of the outer panel may nonetheless be reduced since the arrangement better distributes more of the adhesive 50 on the first face 31.

The detailed descriptions of the above embodiments are not exhaustive descriptions of all embodiments contemplated by the inventors to be within the scope of the invention. By way of example, although the cutouts 34 are shown with a generally U-shape, those of ordinary skill in the art will appreciate that it is within the scope of the present invention to provide the cutouts 34 with any shape. Furthermore, while the present embodiment depicts only one border flange 23 and one edge 33 configured for attaching the inner panel 30 to the outer panel 20, those of ordinary skill in the art will appreciate that the outer panel 20 may be provided with any number of flange ends and the inner panel 30 may be provided with any number of edges for attaching the outer panel 20 to the inner panel 30. Moreover, while in the present embodiment, the inner and outer panels are preferably sheet metal panels, the principals of the present invention may be applied to panels of any material that is capable of being joined via a hemming procedure.

Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims.

I claim:

1. A hemmed panel, comprising:
   an inner panel provided with a first face, a second face, and an edge that defines a plurality of cutouts;
   an outer panel provided with a first face, a second face, and a border flange, which is hemmed over the edge and the first face of the inner panel to form a hemmed portion on the outer panel; and
   an adhesive that bonds the second face of the inner panel to the first face of the outer panel, bonds the hemmed portion of the outer panel to the first face of the inner panel, and is located in the plurality of cutouts.

2. The hemmed panel according to claim 1, wherein the adhesive seals and substantially fills a space between the hemmed portion and the first face of the inner panel.

3. The hemmed panel according to claim 1, wherein the adhesive seals and substantially fills a space between the hemmed portion and the first face of the inner panel and extends outward from a free edge of the hemmed portion.

4. A method for fabricating a hemmed panel, comprising the steps of:
   providing an inner panel that includes a first face, a second face, and an edge that defines a plurality of cutouts;
   providing an outer panel that includes a first face, a second face, and a border flange;
   placing an adhesive between the first face of the outer panel, the second face of the inner panel, and in the plurality of cutouts, whereby the adhesive substantially fills the cutouts and overflows outward from the cutouts; and
   hemming the border flange of the outer panel over the edge and the first face of the inner panel to form a hemmed portion on the outer panel, whereby the adhesive between the hemmed portion and the first face of the inner panel is pressed and flows towards a free edge of the hemmed portion.

5. The method according to claim 4, wherein the adhesive between the hemmed portion and the first face of the inner panel flows, whereby the adhesive substantially fills a space between the hemmed portion and the first face of the inner panel.

6. The hemmed panel according to claim 4, wherein the adhesive between the hemmed portion and the first face of the inner panel flows, whereby the adhesive seals and substantially fills a space between the hemmed portion and the first face of the inner panel and extends outward from a free edge of the hemmed portion.

* * * * *